United States Patent [19]
Barber

[11] 4,085,681
[45] Apr. 25, 1978

[54] TRANSPORTATION SYSTEM
[76] Inventor: Gerald L. Barber, 1209 Edwards Rd., Greenville, S.C. 29607
[21] Appl. No.: 681,417
[22] Filed: Apr. 29, 1976
[51] Int. Cl.² .................. B61B 13/08; B61B 13/12
[52] U.S. Cl. .................. 104/23 FS; 104/89; 104/108; 104/155
[58] Field of Search .......... 104/21, 23 FS, 89, 94, 104/108, 134, 138 R, 139, 147 R, 154–161; 60/407–412; 105/150

[56] References Cited
U.S. PATENT DOCUMENTS

| 553,622 | 1/1896 | Lighthall | 104/154 |
| 3,302,587 | 2/1967 | Knox, Jr. | 104/23 FS |
| 3,467,024 | 9/1969 | Broniewski et al. | 104/155 X |
| 3,540,378 | 11/1970 | Giraud | 104/23 FS |
| 3,718,096 | 2/1973 | Bloomfield et al. | 104/155 |
| 3,771,463 | 11/1973 | Smoot et al. | 104/155 |
| 3,859,923 | 1/1975 | Hamy | 104/23 FS |
| 3,889,602 | 6/1975 | Barber | 104/23 FS |

FOREIGN PATENT DOCUMENTS 2,202,313  7/1973  Germany .................. 104/23 FS Primary Examiner—Trygve M. Blix
Assistant Examiner—Randolph A. Reese
Attorney, Agent, or Firm—Albert L. Jeffers; Roger M. Rickert; John F. Hoffman

[57] ABSTRACT

A transportation system in which vehicular elements are movably mounted on a track and are supported on the track during operation by an air cushion and are propelled along the track by a linear air turbine, cooperating elements of which are on the track and the vehicle.

19 Claims, 12 Drawing Figures

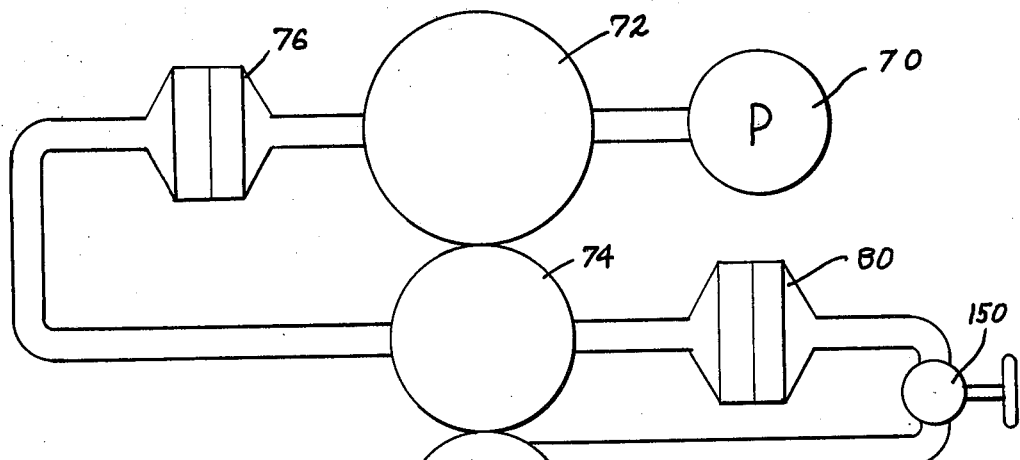
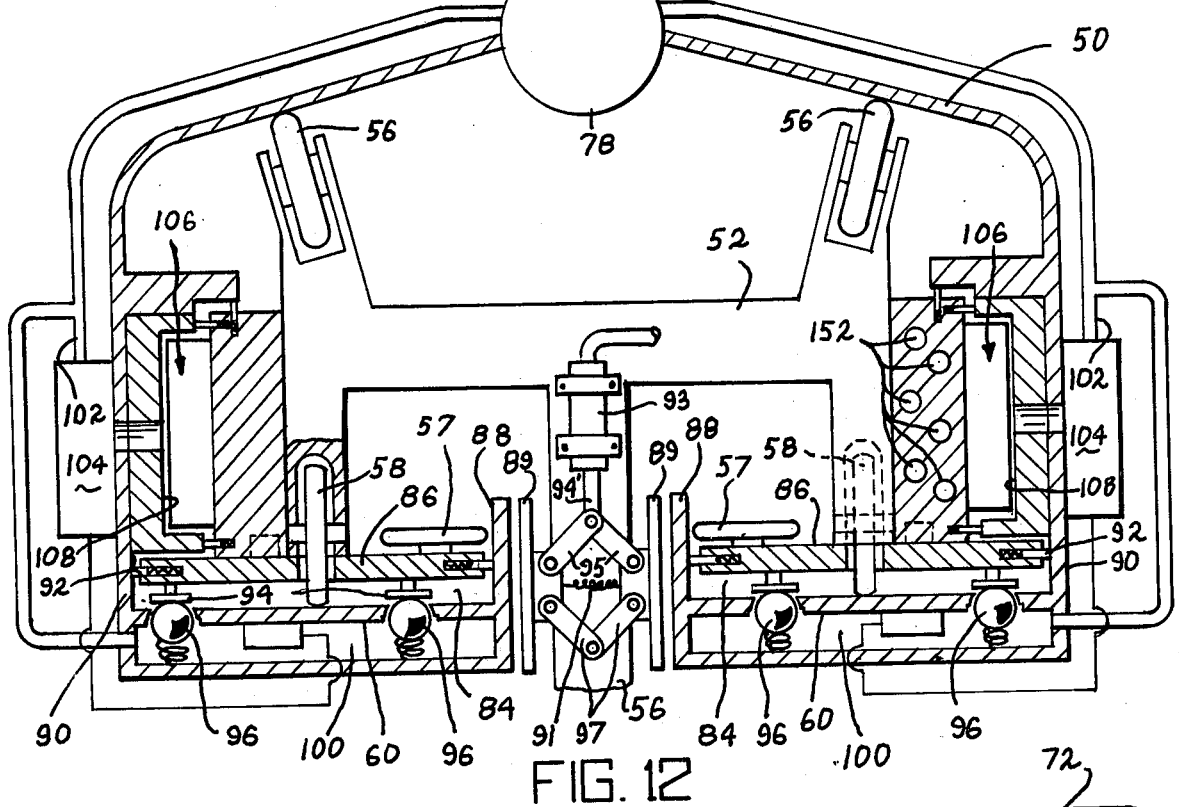
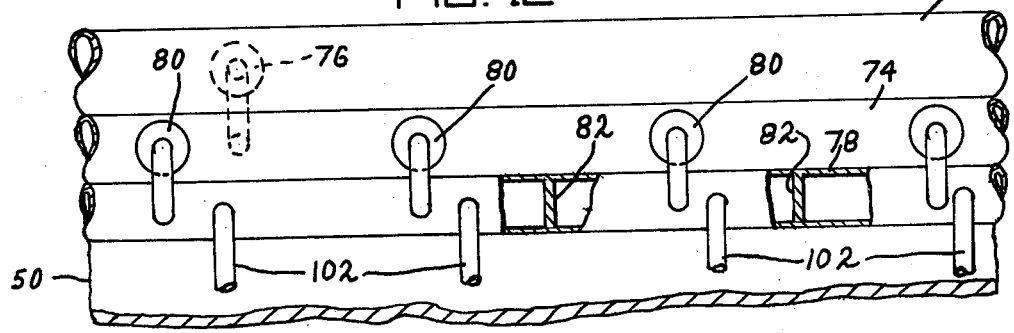

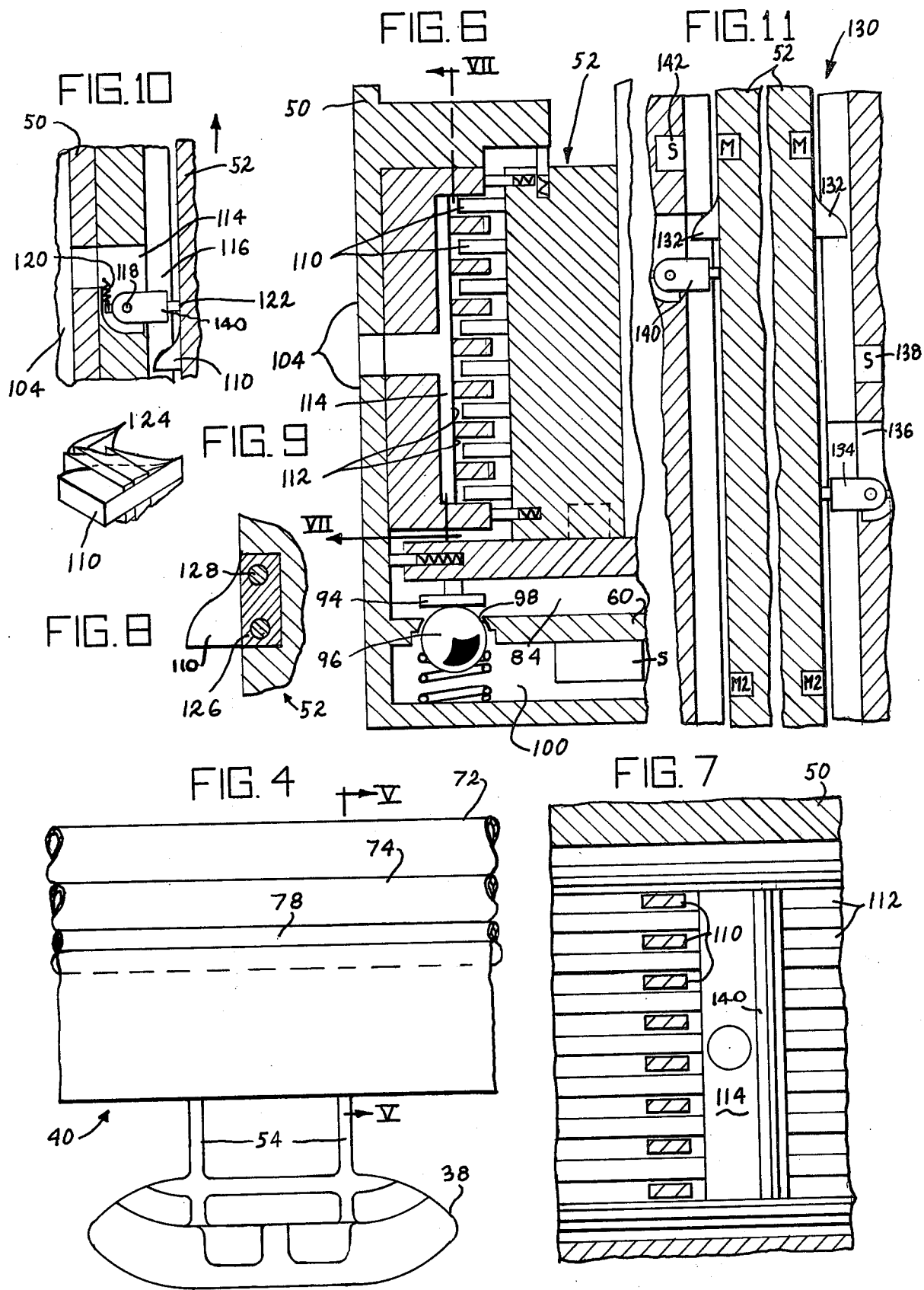

TRANSPORTATION SYSTEM

The present invention relates to a transportation system and, in particular, is concerned with such a system in which compressed air provides the support for supporting the vehicles of the system and for propelling the vehicles.

The problem of movement of people and materials from place to place is becoming increasingly difficult because of the increasing number of people desiring transportation and the increasing amount of materials which must be moved. At the present time, most of the systems in operation providing transportation for people and materials also contribute materially to pollution of the atmosphere and make relatively inefficient use of energy creating materials.

Further, many metropolitan centers are faced with difficult traffic problems because of the congestion of the streets by individual vehicles and this has led to extreme measures being proposed in certain cases, such as closing downtown thorofares to all but service and emergency vehicles. In a case of this nature, some sort of mass transportation system becomes extremely important.

In any case where a great many individually controlled vehicles are to be found, accidents, injury and death will also be found.

With the foregoing in mind, a primary objective of the present invention is the provision of a transportation system which eliminates the problems referred to above.

Another objective is the provision of a transportation system which is conserving of energy materials and does not contribute to pollution in the same manner as present transportation systems.

A still further object is the provision of a transportation system which is safe in operation and which will contribute to a reduction in vehicular accidents and injuries and to lost hours which accompany accidents.

A still further object is the provision of a transportation system in which the system can be made to be relatively private and which is readily available, comfortable, rapid in operation and quiet.

BRIEF SUMMARY OF THE INVENTION

According to the present invention, a transportation system is provided in which vehicles, which can be relatively small, but which can also be quite large, when necessary, are carried by a track system for movement between designated stations. The vehicles are supported on the track during operation by a levitating air cushion so that the vehicles will be movable on the track with little or no impeding of the vehicle motion by frictional forces.

Propulsion of the vehicles on the track is accomplished by linear air turbine means having cooperating elements on the vehicles and on the track with control valves being provided which are actuated by movement of the vehicle to admit air to the linear turbines and to cut off the supply to air thereto. The linear turbines, in brief, comprise longitudinal grooves or slots formed in the tracks and fingers on the vehicle extending into the slots or grooves.

Air is admitted to the slots or grooves on the rearward side of the fingers and, in this manner, the vehicle is propelled along the track. There is, preferably, a linear turbine construction on each side of the vehicle and air is admitted alternately thereto so that the impulses exerted on one side of the vehicle alternate with the impulses supplied to the other side of the vehicle making for smooth propulsion of the vehicle.

The manner in which air is supplied for the levitation and propulsion of the vehicle is an important feature. Air under pressure is supplied to a main conduit which is, preferably, coextensive with the track on which the vehicle is supported, and this air is reduced in pressure and supplied to a second conduit, wherein the air dwells, thereby coming up to ambient temperature, and is then supplied through a further reducing valve to a still further conduit in which the air supply dwells while coming up to ambient temperature.

By permitting air to come up to ambient temperature in each stage of pressure reduction thereof, pressure lost through chilling of the air at the time of expansion is recovered. Furthermore, the linear air turbines referred to are, preferably, in good heat transfer relationship with the ambient atmosphere, whereby the supply of air to the linear turbines is not excessively chilled and a minimum of pressure loss occurs while an impulse is being developed on the vehicle.

The last mentioned, and lowest pressure, air compartment referred to above is, advantageously, compartmented longitudinally which provides for controlled air supply conditions to the linear turbines thereby preventing the vehicles from over speeding.

The exact nature of the present invention will become more clearly apparent upon reference to the following detailed specification taken in connection with the accompanying drawings in which:

FIG. 1 schematically illustrates a typical single track arrangement extending between two designated points, each of the designated points comprising a loading and unloading station, and with two tracks running between the designated points.

FIG. 3 is a schematic view showing how the track arrangement could be mounted in an elevated position or how it could be supported while crossing over a valley or the like.

FIG. 4 is a somewhat schematic side view of a typical vehicle especially for passenger use.

FIG. 5 is a vertical section through the vehicle of FIG. 4 showing details of construction thereof with respect to the support of the vehicle on the track and the turbine arrangements for propelling the vehicle and is indicated by line V—V on FIG. 4.

FIG. 6 is a fragmentary view of a portion of FIG. 5 drawn at enlarged scale and showing more in detail the arrangement at one side of the vehicle for effecting levitation thereof.

FIG. 7 is a section on line VII—VII of FIG. 6 showing details of the linear turbine.

FIGS. 8, 9 and 10 show further details of the linear turbine.

FIG. 11 shows the staggered arrangement of the turbines on opposite sides of the vehicle and the placement of the sensors and control magnets pertaining thereto.

FIG. 12 shows the arrangement of supply conduits for the system.

DETAILED DESCRIPTION OF THE INVENTION

Figure 1:
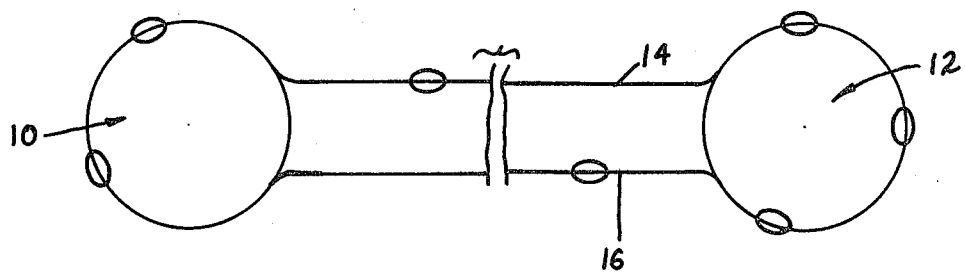
Figure 2:
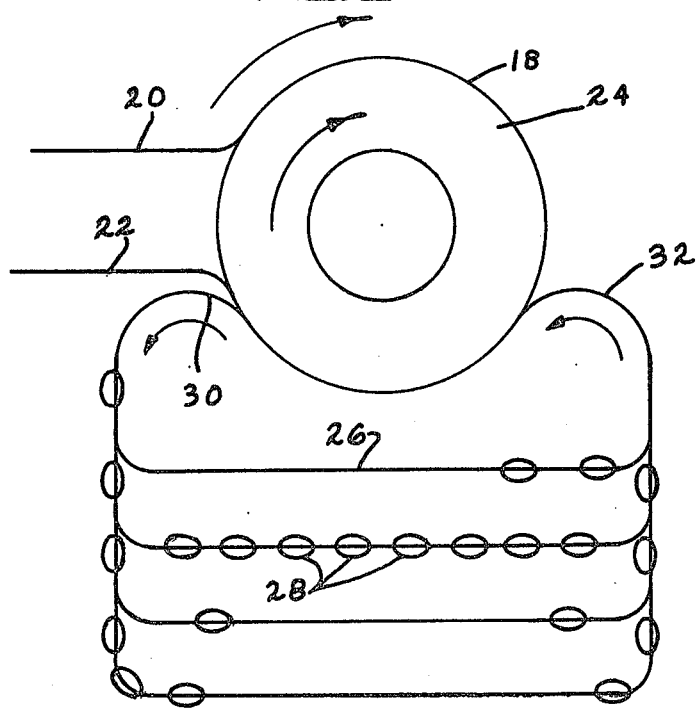
FIG. 2 is a schematic representation of a station similar to either of the stations of FIG. 1 but also illustrating a reservoir arrangement for storing vehicles to be called into use when needed and for receiving vehicles for storage when not needed.

Referring to the drawings somewhat more in detail, typical track layouts are illustrated in FIGS. 1 and 2.

In FIG. 1, reference numerals 10 and 12 indicate circular or arcuate track sections forming terminals and extending therebetween are longitudinal track sections 14 and 16. Each of the terminals 10 and 12 may comprise substantially circular track sections and may even include means for permitting the transportation vehicles to move about the respective track section more than a single time.

In FIG. 2, reference numeral 18 represents a circular track section forming a terminal or station and having longitudinal track sections 20 and 22 leading thereto and therefrom. Terminal 18 also includes a rotary turn table 24 which may be used for loading purposes so that passengers, which may enter the turntable from the center, will be synchronized with the transporation vehicles moving along the circular portion of the track and thereby facilitate loading and unloading.

Inasmuch as the load on the transportation system will vary substantially, means are provided in FIG. 2 for removing cars from the system and for supplying cars to the system. For example, in adjacent cooperative relation with the circular track section in terminal or station 18 there are parallel storage stations 26 adapted for storing vehicles 28. Vehicles to be stored are removed from the circular track in the respective station as by switches and curved track section 30 and are returned thereto when needed by the curved track section 32.

Figure 3:
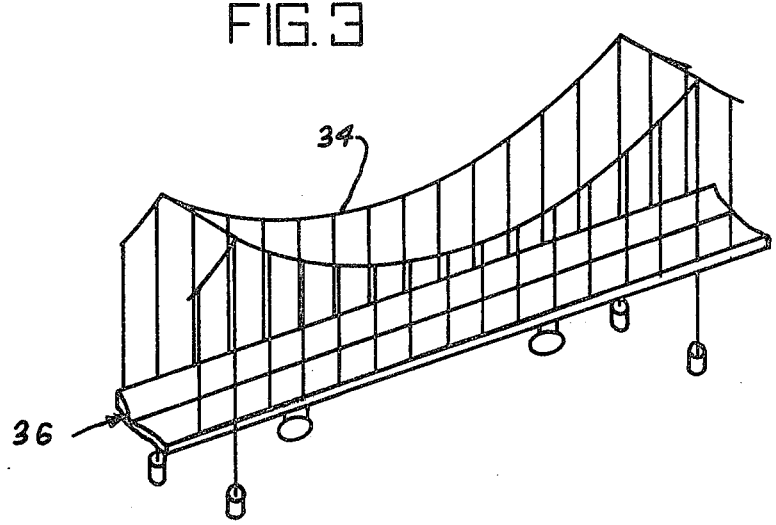

The track referred to is a substantially horizontal vehicle supporting structure and may be directly ground supported or it may be suspended as from a bridge like structure 34, especially where there is a ravine or the like to cross, as shown in FIG. 3 wherein the supported track is generally indicated by reference numeral 36.

A typical passenger vehicle is shown from the side in FIG. 4 at 38, and is dependent beneath a track structure, such as is shown in FIGS. 1 and 3, and which track in FIG. 4 is generally indicated at 40. In the case of a suspended vehicle, as in FIG. 4, the track is always above the vehicle and is thus, itself, supported on a suitable elevated structure consisting of posts, or the like, disposed along the sides thereof.

It is, of course, possible for the vehicle to be positioned above the track and, in this case, the track could be ground supported and no structure would be required to support the track in elevated position. This last mentioned arrangement for the track would be satisfactory in level terrain and where ample space was available for the installation of the track.

In situations where the terrain is not level and, especially, where ground is highly valuable, as in metropolitan areas and the like, it may be preferable to support the track in an elevated location with the vehicles either suspended therebeneath or supported above the track. The principles of the present invention are equally adapted to any of the circumstances identified above.

The arrangement shown in FIG. 4 for suspending the vehicle from the track is illustrated in more detail in FIG. 5, which is a vertical section indicated by line V—V on FIG. 4. FIG. 5 shows principally the track structure since the vehicle structure per se is subject to wide modification to adapt it to particular circumstances and purposes.

In FIG. 5, the track structure generally consists of a main housing portion 50 within which there is disclosed the carriage 52 that carries the vehicle proper as by means of the suspension members 54 that extend vertically downwardly from carriage 52 to an upper portion of the vehicle 38.

Carriage 52 is movable within the housing 50 and has upper wheel means 56 adapted for engaging the underside of the top part of housing portion 50, while having other wheel means 58 at the bottom adapted for engaging a horizontal wall member 60 forming a part of housing portion 50 of the track.

It will be understood that wheel means 56 and 58 could comprise multiple wheels spaced in the longitudinal direction of housing portion 50 and carriage 52.

Wheel means 56 and 58 are not provided for the purpose, primarily, of rollingly supporting the carriage 52 and the vehicle carried thereby on housing portion 50 of the track but are more in the nature of limiting elements that limit the movement of the carriage within housing portion 50 and, furthermore, provide means for rollingly supporting the carriage within the housing portion 50 when the carriage 52 is not supported within the housing portion by an air cushion.

Furthermore, the wheel means at 56, or similar wheel means, can be arranged to limit lateral movement of carriage 52 within housing portion 50 of the track. The wheel means are, thus, stabilizing elements to stabilize the carriage 52 as it is propelled along housing 50 and, also, rollingly support the vehicle when it is not supported by air.

The housing portion 50 of the track has associated therewith compressed air supply means which are schematically illustrated in FIGS. 5 and 12. In the drawings, the air supply means will be seen to comprise compressor means 70 which supply a high pressure conduit 72 substantially coextensive with the track. It will be understood at this point, that for elongated transportation systems, a plurality of compressor means 70 could be provided distributed along the track.

Furthermore, the main high pressure conduit 72 could be segmented, if so desired, with each supplied by respective compressor means in the form of one or more compressors. Associated with high pressure conduit 72 is an intermediate pressure conduit 74 connected to high pressure conduit 72 by way of pressure reducing valve 76. As before, the conduit 74 could be segmented longitudinally or it could consist of a single conduit with a plurality of the pressure reducing valves 76 distributed along the length of conduit 72 and 74, as might be required to produce substantially uniform pressure conditions within intermediate pressure conduit 74 along substantially the full length thereof.

A still further and lower pressure conduit 78 is connected with conduit 74 via pressure reducing valve means 80. As will be seen in FIG. 12, lower pressure conduit 78 is provided with partitions 82 distributed therealong so that this conduit is deliberately segmented in the longitudinal direction. Each compartment of conduit 78 provided by the partition 82 could, of course, be a separate section of conduit. Each of the segments or sections of conduit 78 between partitions 82 is connected with intermediate conduit 74 via at least one respective pressure reducing valve 80. The purpose of segmenting low pressure conduit 78 in the illustrated manner is influential in regulating the speed of movement of the carriages and carriages 52 and vehicles supported thereby along the track as it will become more apparent hereinafter.

The aforementioned horizontal wall 60, of which there is one beneath each lateral side of the vehicle, and which are adapted to be engaged by wheel means 58 of carriage 52, form the lower walls of levitation chambers 84, the upper walls of which are formed by wall members 86 on the bottom of carriage 52. The horizontal walls 60 are provided at the inner ends with limiting vertical wall elements 88 of housing 50, while at the laterally outer ends of horizontal walls 60 the housing portion 50 has limiting vertical walls 90. The walls 86 in the lower portion of carriage 52 are provided with laterally yieldable seal elements 92 which will best be seen in FIGS. 5 and 6, which seal the levitation chambers 84 from the escape of levitating air, while at the same time permitting some freedom of lateral movement of the carriage 52 within housing portion 50.

The walls 86 of the carriage have dependent shoe members 94 thereon adapted for engaging the upper surfaces of balls, or valve members, 96 which are disposed in apertures 98 provided in wall 60. The shoes 94 are effective for pressing the balls 96 downwardly into the position in which they are illustrated in FIGS. 5 and 6, and for holding the balls in such position during the time that the respective carriage is moving over the balls therebeneath. When the balls are thus actuated downwardly by shoes 94 air can flow from supply chamber 100 through apertures, or seats, 98 and into levitation chambers 84 and thereby exert an upward force on walls 86 of carriage 52.

It will be apparent that a relatively small pressure is sufficient for supporting the carriage 52 and that the valve arrangement is self-compensating in that the opening of the valves comprising the balls 96 and the seats, or apertures, 98 is inversely proportional to the amount which the carriage lifts from a lowermost position, and in which position wheel means 58 would engage wall 60.

It will be understood that the ends of carriage 52 would include means substantially closing the opposite ends of the respective levitation chamber against excessive loss of levitation air from the chamber. Such means could include seals of the type shown at 92, or could be in the form of flexible rubber-like seal strips on the edges of walls at the ends of the chamber.

In practice, the valving arrangement above described is so selected that the wheel means 58 will be lifted from, or at least will no more than lightly engage walls 60, whereby the carriage 52 and the vehicle suspended therefrom will become substantially freely movable in the longitudinal direction of the track of which housing portion 50 forms a part.

As mentioned above, there is a levitating chamber 84 at each side of the carriage and pertaining to each is a supply chamber 100 and a plurality of valve balls 96 distributed in wall 60 for each supply chamber. The arrangement is such that the carriage is supported against substantial tilting motion about a longitudinal axis because of the self-compensating nature of the valve means arrangement. Lateral movement of the carriage 52 within housing portion 50, is limited by wheel means 56, or like wheel means, which will sustain lateral forces thereon.

A vehicle supported in the track in the aforesaid manner is propelled along the track in a novel manner, according to the present invention, by linear air turbine means, part of which is embodied in housing portion 50 and part of which is embodied in each of the carriages 52. The linear turbine means are supplied from the lowest pressure conduit 78 and which may also supply the supply chambers 100 for levitation of the carriage and vehicle.

The low pressure conduit 78 is connected by conduits 102 with valves 104 on opposite sides of the housing portion 50 of the track and each valve controls the air supply to a respective linear turbine arrangement defined by cooperating elements on the housing portion 50 and the carriage 52.

The linear turbine referred to, and which forms an important part of the present invention, will be seen in FIGS. 5 to 11 and which views include certain modifications in the turbine structure. Essentially, an air turbine, according to the present invention, comprises piston means in the form of one or more piston elements on the carriage and a corresponding number of recesses in the housing portion 50 in which the piston or pistons move, with movable partitions provided in the recesses so that once the piston means has passed the partitions, air admitted to the space between a partition and the piston means will impel the piston means, to move the carriage in the selected direction. By utilizing sensing devices, the position of each carriage along the housing portion 50 of the track can be determined and the air supply to the linear turbine means pertaining to the respective carriage can be turned on and turned off at the proper instants.

In the drawings, the air turbine means are schematically illustrated at 106 in FIG. 5; while being illustrated somewhat more in detail in FIGS. 7 and 11. FIG. 5 shows a single piston means on each side of carriage 52 disposed in a respective elongated recess 108 in the housing portion 50 of the track structure.

The linear turbine means could consist of one or more turbines on each side of the carriage, preferably staggered, as shown, or the turbine means could comprise one or more turbines on at least one of the top and bottom of the carriage, as might be desired, or convenient.

In practice, rather than utilizing a single large piston for each linear turbine, a plurality of smaller pistons 110 are employed, as will be seen in FIG. 6, with the housing portion 50 in the track structure being provided with a respective groove or cylinder arrangement 112 for each of the pistons 110.

Reference to FIGS. 6 through 11, in particular, will reveal the manner in which the linear turbine means operates for propelling the carriages along housing 50 of the track. At certain spaced intervals along the track, there are provided the recesses 114 which extend at right angles to the direction of movement of the carriages in housing portion 50 and with the said recesses being in communication with the outlet of a respective valve 104 so that when the valve is opened a supply of air under pressure will be admitted into the pertaining recess 114. It will be noted that the passage leading from the valve into the recess is quite large thereby minimizing pressure loss due to friction.

The recess 114 will be seen in FIG. 6 to communicate with each of the longitudinal grooves or cylinders 112 to which the pistons 110 are movable.

On the upstream side of each recess 114 there is located a swingable partition member 16 pivoted at 118 and biased toward the position in which it is illustrated in FIG. 10 by a spring 120. In FIG. 10, it will be seen that as the carriage 52 moves in the direction of the arrow, the pistons 110 will engage partition member 116 and cause it to deflect in the counterclockwise direction and then snap back after the pistons have passed. The partition member 116 may include a radially resilient seal element 122 for substantial sealing engagement with the side of the carriage 52 after the partition member has swung back to its FIG. 10 position.

Each piston 110 may have resilient rubber-like boot means 124 thereon for effectively sealing about the piston to prevent excessive loss of air after the pistons have passed a partition member 116 and air has been admitted into the respective recess 114.

Further, the pistons illustrated may be mounted on a member 126 vertically slidable on the respective carriage as by being mounted on the vertical rods 128. This arrangement is illustrated in FIG. 8 and represents one manner in which the piston structure can be arranged so that vertical movement of the carriage 52 in the track is possible without, at the same time, providing excessive clearance around the pistons to compensate for the carriage movement.

With the arrangement of FIG. 8, the pistons could be relatively closely fitted in respective recesses and remain in fixed relation to the recesses during vertical movement of the carriage by permitting the piston structure to slide on rods 128. Clearance would, of course, be provided at the ends of the piston structure to permit such movement.

The linear turbine means described above pertains to each said linear turbine and of which there could be as many associated with the carriage as might be desired. Further, the linear turbines could be arranged on the carriage in any desired manner, either on the top or on the bottom or on the sides or any combination thereof. For certain design considerations, the preferred location for the turbine means on the sides of the vehicle is illustrated herein.

It is also preferred for the turbine means on opposite sides of the carriage to be staggered in the longitudinal direction of the carriage and to be actuated alternately thereby providing for smoother propelling of the carriage along the track. For controlling the operation of the valves 104, each valve is provided with actuating means which will move the valve between open and closed positions.

Each actuating means may be electrically operated and under the control of a sensing system comprising a sensor stationarily mounted on the track structure and under the control of magnet elements carried by the carriage. In this manner, opening and closing of the valves 104 can be synchronized with movement of the respective carriages along the track structure.

In FIG. 11, for example, the turbine means toward the right side of the vehicle, and indicated by arrow 130, has the piston means 132 displaced a substantial distance from the respective tiltable partition element 134. The supply of air to the respective recess 136 is under the control of a sensor 138 which is operated to open the respective valve 104 by magnet M1 in the respective carriage 52 and is operated to close the respective valve by second magnet element M2 of carriage 52. The magnets may, for example, be of opposite polarity or may operate in other known manners to actuate sensor 138.

On the opposite side of carriage 52, the corresponding pistons 132 and magnet elements M1 and M2 are laterally aligned with those referred to above. However, the swingable partition element 140 on the left side of FIG. 11 is staggered relative to the swingable partition element 134 on the other side of the vehicle and the sensor 142 on the left side of the vehicle is also staggered in respect of sensor 138 on the right side. As will be seen, the arrangement provides for alternate energization of the turbines and thereby the application of a smooth propulsive effort to the carriage 52.

It will be appreciated that the rate at which air can be supplied to the linear turbines is under the control of the rate at which the various sections of conduit 78 between partitions 82 can be maintained under pressure. With this in mind, each connection leading from intermediate pressure conduit 74 to lower pressure conduit 78 either has built into each pressure reducing valve 80 a flow controlling element or there is provided in each of the conduits adjustable flow controlling element, such as the valve, indicated at 150 in FIG. 5.

By controlling the rate of flow of air into the various longitudinal portions of conduit 78, it is insured that a series of vehicles moving along the track will only be propelled therealong at a certain speed while, furthermore, the vehicles cannot crowd up on top of one another because, if the vehicles became crowded, the sections of conduit 78 would drop in pressure and the propelling forces exerted on the carriages would diminish toward the rear of the series of carriages, thus, preventing the carriages from crowding up beyond the acceptable limit.

At the same time, it will be appreciated that energy lost from the air in having the pressure reduced from a higher pressure conduit to a lower pressure conduit is largely recovered by providing for an ample supply of air so that the temperature of the ambient atmosphere will restore the air to ambient temperature and, thus, to full energy content after it has been expanded through a relief valve and flows into the next lower pressure conduit.

Furthermore, the linear turbine means lends itself to the provision of good heat transfer so that the best conditions can be maintained therein for utilizing the air supplied thereto.

The pressure drop associated with expansion of fluid due to the simultaneous drop in temperature of the fluid is thus compensated and maximum work can be extracted from the fluid. With this in mind, the piston arrangement in which a plurality of small pistons run in a plurality of small grooves is of merit because the greatest area is provided for the transfer of heat into the expanding air which is propelling the carriage along the track.

The air turbines according to the present invention are well suited to meet the requirements of efficient operation of the system because the stationary or cylinder portion of each turbine is utilized for only about one-fifth to one-tenth of a second and is then exposed to ambient air conditions for about two seconds. By constructing the turbine portions so as to have good heat conducting characteristics as, for example, by making the turbines out of aluminum, highly efficient conditions can be established.

Furthermore, the piston structure could be provided with longitudinal air passages in the vehicle and still further improve the efficiency of operation of the device. Such air passages are schematically indicated at 152 in the piston supporting arrangement at the right side of FIG. 5.

In addition to the aforementioned wheel means 56 which limit upward movement of carriage means 52 when it is floatingly supported by fluid under pressure in chamber means 84, and wheel means 58 which rollingly support the carriage means on walls 60 when chamber means 84 are relieved of pressure, there may also be wheel means 57 positioned to engage the outer sides of walls 88 thereby to limit lateral movement of the carriage in housing 50 of the track means.

The wheel means 56, 57 and 58 are preferably normally spaced from the housing 50 when the carriage is floatingly supported on the air cushions provided therefor but are operative to prevent undesired vertical and lateral movement of the carriage means within the housing and also, as mentioned, to rollingly support the carriage means when the levitating cushions therebeneath are depressurized.

There are also cooperating elements of brake means between the track and the carriage means and these may take the form of brake shoes 89 positioned in opposed relation to the inwardly facing sides of walls 88. The brake shoes are pulled inwardly away from the walls as by a spring 91 and are adapted for being pressed outwardly into frictional engagement with the walls by a supply of pressure to a cylinder 93 which is operable for actuating a ram 94' connected to the upper pair of levers 95 which, in cooperation with a lower pair of levers 97, move the brake shoes 89 in parallelism with themselves toward and away from the inner sides of walls 88.

The supply of air to cylinder 93 can be controlled automatically in order to prevent vehicles from colliding or it can be under manual control if desired.

The supply of fluid for cylinder 93 can be derived from the air pressure supply system, or it can be generated within the carriage means or the vehicle suspended therefrom in any suitable manner, such as by using low pressure air from the supply system to operate a motor compressor arrangement which would, in turn, provide for a higher pressure supply of fluid for actuating auxiliaries, such as the brake actuating cylinder 93.

Modifications may be made within the scope of the appended claims.

What is claimed is:

1. In a transportation system; track means, carriage means movable along said track means, air supply means extending along said track means, said carriage means and track means forming levitation chamber means therebetween, linear air turbine means formed by cooperating elements on said track means and carriage means, first valve means for admitting air from said supply means to said chamber means to support said carriage means in the track means, and second valve means operable for controlling the supply of air from said supply means to said turbine means to propel said carriage means along said track means, said air supply means comprising a series of parallel and longitudinally coextensive conduits, compressor means connected to one of the conduits of said series, pressure reducing valve means connecting each conduit with the next adjacent conduit so the pressure reduces in the conduits from said one conduit to the final conduit at the other end of the series of conduits, the final conduit of said series of conduits comprising a plurality of longitudinally spaced unvalved partitions dividing the conduit into axial segments, said second valve means being interposed between said turbine means and respective segments of the last-mentioned said conduit, each said segment of said final conduit supplied with air from the preceding conduit in the series of conduits via a respective one of said pressure reducing valves, and a flow control valve in series with each pressure reducing valve.

2. A transportation system according to claim 1 which includes means sealing each said chamber against loss of air therefrom to the outside.

3. A transportation system according to claim 1 in which said chamber means comprises a respective chamber at each lateral side of the carriage means, said track means including an upwardly facing wall at the bottom of each chamber means and said carriage means having a downwardly facing wall above each said upwardly facing wall, a cavity beneath each said upwardly facing wall supplied with air under pressure, said first valve means comprising normally closed valve means distributed in each upwardly facing wall, and means operated by said carriage means for opening said first valve means therebeneath to admit air into said levitation chambers for floatingly supporting the carriage means in said track means.

4. A transportation system according to claim 3 in which each said first valve means comprises an aperture in said upwardly facing wall and a valve member engaging said aperture from below and resiliently biased in the upward direction and protruding upwardly above said upwardly facing wall from the upper ends of the apertures, and shoe elements dependent from the carriage means and engaging said valve members from above as the carriage means passes over the valve members.

5. A transportation system according to claim 1 in which said track means includes a housing surrounding said carriage means, and wheel means on the carriage means which are normally spaced from the housing when the carriage is supported in a normal position by air in said chamber means, said wheel means including wheels adapted rollingly to support the carriage means in the housing in the absence of air under pressure in said chamber means.

6. A transportation system according to claim 5 in which said wheel means include further wheels engageable with the housing when the carriage means moves upwardly beyond the said normal position thereof.

7. A transportation system according to claim 5 in which said wheel means include wheel means limiting the lateral movement of the carriage means in said housing and also limiting the upward movement of said carriage means beyond the said normal position thereof.

8. A transportation system according to claim 1 which includes vehicle means supported by each carriage means.

9. A transportation system according to claim 1 which includes vehicle means dependently supported by each carriage means.

10. A transportation system according to claim 1 which includes cooperating elements of brake means carried by said carriage means and track means.

11. In a transportation system; track means, carriage means movable along said track means, air supply means extending along said track means, said carriage means and track means forming levitation chamber means therebetween, linear air turbine means formed by cooperating elements on said track means and carriage means, first valve means for admitting air from said supply means to said chamber means to support said carriage means in the track means, and second valve means operable for controlling the supply of air from said supply means to said turbine means to propel said carriage means along said track means, each said linear turbine means comprising at least one piston on the carriage means having a surface area facing rearwardly relative to the direction of movement of the carriage means and groove means in the track means in which the piston is movable, partition means in the groove means having a normal position in which it presents a forwardly facing surface area, said partition means being retractable from the path of the piston to permit the piston to pass thereby and then returning to said normal position, and said second valve means supplying air under pressure to the space between said surface areas to develop propulsive force on said carriage means.

12. A transportation system according to claim 11 in which said turbine means for each carriage means comprises groove means extending along the track means, partition means spaced along said groove means, said second valve means comprising a control valve for controlling the supply of air to the forward side of each partition means, sensor means connected to each said control valve to control the opening and clsoing thereof, and means on each carriage means operable to actuate said sensor means during movement of the carriage means along said track means.

13. A transportation system according to claim 12 in which said turbine means comprises at least two laterally spaced grooves in the track, a piston on the carriage means movable along each groove, the respective pistons on each carriage means passing by the partition means in the respective grooves alternately.

14. A transportation system according to claim 11 in which each turbine means comprises a plurality of parallel grooves in the track means, and a plurality of pistons on each carriage means in the grooves and aligned in a direction perpendicular to the direction of travel of the carriage means.

15. A transportation system according to claim 14 which includes a member to which said pistons are attached, and means for connecting said member to the carriage means for vertical movement thereon.

16. A transportation system according to claim 11 which includes seal means on each piston sealingly engaging the walls of the respective groove.

17. A transportation system according to claim 11 in which each said partition means is pivotally supported in the groove means and is adapted for being deflected out of the path of the piston by movement of the piston into engagement with the rearward side of the partition means.

18. A transportation system according to claim 11 which includes resilient means carried by at least one of said carriage means and track means and engaging the other thereof and sealing therebetween along the marginal edges of the said linear turbine means.

19. A transportation system according to claim 11 which includes passage means in said carriage means for conducting fluid in heat exchange relation with said piston.

* * * * *

UNITED STATES PATENT AND TRADEMARK OFFICE
CERTIFICATE OF CORRECTION

PATENT NO. : 4,085,681
DATED : April 25, 1978
INVENTOR(S) : Gerald L. Barber

It is certified that error appears in the above-identified patent and that said Letters Patent are hereby corrected as shown below:

Col. 1, line 61, "to" should be -- of --.

Col. 6, line 66, "16" should be -- 116 --.

Col. 11, line 24, (Clain 12) "clsoing" should be -- closing --.

Signed and Sealed this

Twelfth Day of September 1978

[SEAL]

Attest:

RUTH C. MASON
*Attesting Officer*

DONALD W. BANNER
*Commissioner of Patents and Trademarks*